United States Patent [19]
Molby

[11] 3,815,938
[45] June 11, 1974

[54] ADJUSTABLE BALL PIN PIVOT

[75] Inventor: Lloyd A. Molby, Longview, Tex.

[73] Assignee: R. G. LeTourneau Inc., Longview, Tex.

[22] Filed: July 13, 1970

[21] Appl. No.: 54,396

[52] U.S. Cl............... 280/461 R, 280/400, 180/51, 308/72
[51] Int. Cl............................................ B62d 53/02
[58] Field of Search........ 280/461 R, 433, 456, 492, 280/400; 180/51; 308/72

[56] References Cited
UNITED STATES PATENTS

| | | | |
|---|---|---|---|
| 1,986,149 | 1/1935 | Harris | 280/433 |
| 3,134,628 | 5/1964 | Lackey | 280/433 X |
| 3,433,502 | 3/1969 | Omon | 180/51 X |

*Primary Examiner*—Leo Friaglia
*Attorney, Agent, or Firm*—Wm. T. Wofford

[57] ABSTRACT

A pivot connection for effecting axial alignment adjustment for the ball portion of a ball and socket pivot both to facilitate initial installation and to compensate for wear, characterized by a ball pin having a collet base portion including a bolt ring, a cylindrical shank, and a ball affixed at the other end thereof; a bore disposed in the part to which the ball pin is to be affixed, with a bolt ring surrounding the bore and mating with the bolt ring of the collet base portion; bolts for affixing the collet base portion to the bolt ring surrounding the bore; and a plurality of shims interposed between the bolt rings. A spherical socket for removably receiving said ball portion is characterized by a base portion that is permanently affixed to a second member; a cap portion that is removably affixed to the base portion; and a plurality of shims adapted to be interposed intermediate said cap portion and said base portion for adjusting bearing clearance initially and for compensating for wear. Also disclosed are specific embodiments in which the base portion has a hemispherically shaped, replaceable liner; and a bearing retainer is also disposed intermediate said cap portion and said base portion of the socket.

6 Claims, 3 Drawing Figures

PATENTED JUN 11 1974 3,815,938

ADJUSTABLE BALL PIN PIVOT

BACKGROUND OF THE INVENTION

1. Field of the Invention

This invention relates to an improved pivot construction; and, more particularly, to a hinge connection having axially spaced joints employing ball and socket means.

2. Description of the Prior Art

Various types of joints have been employed in the prior art to effect the hinged connection between portions of large vehicles; such as, earth moving vehicles and timber hauling vehicles. Such construction has included pin shafts through apertures in both a central member and a yoke frame member disposed about the central member. A preferred type of connection has been a ball pin connection in which a pair of ball pins are connected with a central member and received in sockets on a mating yoke frame member. One big disadvantage with the ball pin type construction, heretofore, has been obtaining initial alignment, since the ball pins were ordinarily permanently affixed to their central member and the sockets were permanently affixed to their yoke member such that alignment had to be carefully effected during fabrication of the respective members. Moreover, such prior art structures had no way of compensating for wear to retain proper axial alignment of the ball and the socket, as well as to maintain proper bearing clearance, to prevent the ball and socket joint from becoming loose with wear. Also known in the prior art are self-aligning joints in which a pivot pin between members has a cylindrically shaped portion and respective frusto-conical pins and apertures on both sides of the spherically shaped portion. Such latter devices also were not amenable to compensations for wear; and required careful fabrication to effect proper axial alignment initially, since the frusto-conical pins did not allow axial adjustment.

Thus, the prior art was not satisfactory in effecting an economical, readily alignable joint that could be adjusted for wear.

DESCRIPTION OF THE PREFERRED EMBODIMENT(S)

Figures 1, 2, 3:
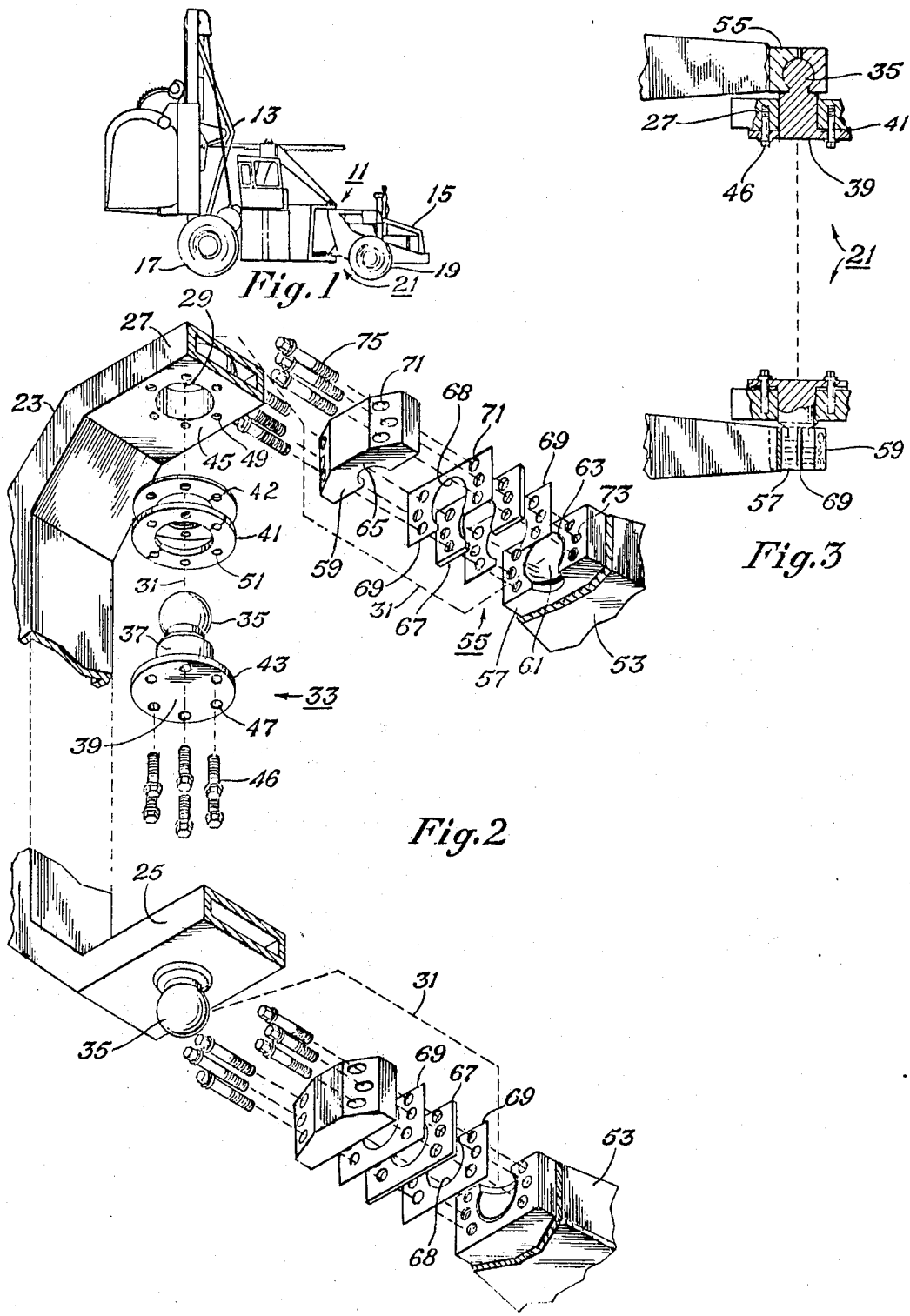
FIG. 1 is an elevational view of a vehicle employing one embodiment of this invention.
FIG. 2 is an exploded isometric illustrating details of one embodiment of this invention.
FIG. 3 is a plan view, partly in section, illustrating the assembled embodiment of FIG. 2.

It is a primary object of this invention to provide an improved pivot connection; such as, one that may be employed between front and rear frames of an articulated vehicle; that facilitates initial assembly and eliminates the high degree of care necessary heretofore in obtaining proper axial adjustment of a ball of a ball pin with respect to its socket in the pivot connection.

It is also an object of this invention to provide a pair of ball pin socket type joints between a pair of pivotal members wherein not only initial alignment axially is facilitated, but also realignment or replacement, to compensate for wear, is readily effected.

It is also an object of this invention to provide a pair of ball pin-socket type joints between a pair of pivotal members wherein the ball pin-to-socket bearing clearance can be adjusted, both initially and to compensate for wear.

These and other objects of this invention will be apparent to those familiar with the art when the following description is read in conjunction with the drawings.

Referring to FIG. 1, the present invention is shown incorporated in an articulated vehicle 11 having a front section 13 and a rear section 15. Front section 13 has a pair of front wheels 17. Rear section 15 has a pair of rear wheels 19. The front and rear sections 13 and 15 are pivotally connected via pivot connection 21 for horizontal steering movement relative to one another about a vertical axis. Specifically, a conventional steering motor rotates a small steering gear on one section with respect to an engaging sector gear on the opposite section in response to a steering switch in the operator's console. Alternatively, a hydraulic cylinder, piston and shaft arrangement between the front and rear sections on one or both sides of the pivot connection effect the desired degree of steering in response to the steer switch in the operator's console.

Referring to FIG. 2, a first member 23 is bifurcated to form two arms 25 and 27 of a yoke. As illustrated in FIG. 1, the first member 23 is connected with front section 13 and arms 25 and 27 extend rearwardly, although it could be connected with the rear section 15 and arms 25 and 27 extend forwardly. Arms 25 and 27 each have a bore 29 for receiving the shank of a ball pin therethrough. The bores 29 have a common lineal axis 31 that is the same as the vertical axis about which the sections of the vehicle are steered. Bores 29 are cylindrical. The cylindrical bores 29 bear thrust without generating a vertical thrust component; and allow movement of a ball pin along the lineal axis 31 to obtain axial adjustment and centering of the ball portion with respect to a receiving socket. Bores 29 are disposed at a distance along arms 25 and 27 sufficient to be able to align a ball pin having its center along the lineal axis 31 with a receiving socket.

A pair of ball pins 33 are adapted for being inserted through the respective cylindrical bores 29. Each ball pin comprises a ball portion 35, a shank portion 37 and a collet base portion 39. Ball portion 35 is spherically shaped and disposed at one end for pivotally engaging a spherically shaped bearing socket in thrust bearing relationship. Shank portion 37 is cylindrical, is connected with the ball portion, and is adapted to conformingly engage the cylindrical bore 29 in thrust bearing relationship without generating a vertical thrust component. Because of the cylindrical shape of the shank portion and of the bore 29, the ball portion 35 may be axially aligned, or adjusted along the longitudinal axis of the ball pin, to properly engage and be centered in the receiving socket. The collet base portion 39 is connected with the shank portion 37 and serves as an abutment for engaging arm 27 or any of the shims inserted therebetween.

A plurality of pin shims 41 are disposed intermediate the collet base portion 39 and arm 27 for effecting axial adjustment of ball portion 35. Each pin shim 41 is adapted to fit over cylindrical shank portion 37. Preferably, shims 41 are split through diametrically opposed bolt apertures, as illustrated by split cut 42, to form a plurality of sections. The split shims facilitate field removal, since at least two stud bolts can be left in place and the shims removed, as described in more detail hereinafter.

A first fastener means is provided for connecting respective ball pins to respective arms of the first member, with the shank of the ball pins in thrust bearing relationship with the respective bores. A first fastener means comprises a first bolt ring 43 about the periphery of the collet base portion 39, a second bolt ring 45 disposed on arms 25 and 27 about the periphery of bores 29; and a plurality of threaded stud bolts. The first bolt ring 43 has a plurality of bolt apertures 47 penetrating through the flange of collet base portion 39 for receiving a plurality of stud bolts 46. The second bolt ring 45 has a plurality of matching threaded apertures 49 disposed peripherally about the bores 29. That is, the threaded apertures 49 match bolt apertures 47 so as to allow insertion of the threaded stud bolts 46. In like manner, each pin shim 41 has a plurality of matching bolt apertures 51 to allow passing of stud bolt 46 therethrough. The stud bolts 46 are then passed through the respective bolt apertures and into conforming engagement with the threaded apertures 49 in the second bolt ring 45. Thus, the stud bolts may be tightened to affix the collet base portion 39 to the respective arms 25 and 27 with the ball portion 35 suitably adjusted along its axial length to engage and be centered in its receiving socket. As the ball portion 35 becomes worn, it may be easily adjusted along its axis by removal of the stud bolts 46, removal of one or more pin shims 41 and refastening of stud bolts 46. With the split shim structure at least two stud bolts 46 may be left in place, the remainder removed and the sections of one or more shims removed. Thereafter, the stud bolts 46 are replaced to complete the realignment of the ball pin with its receiving socket. Similarly, when too badly worn such that the ball pin becomes loose in its receiving socket, as described in more detail hereinafter, it may be removed and replaced by another, unworn, ball pin.

A second member 53, located on the opposite section of the articulated vehicle 11 from the first member 23, is adapted to pivotally or hingingly engage the first member 23. The second member 53 has socket receiving means such as a pair of sockets 55 that are adapted for releasably receiving the ball portion of the ball pin. The pair of sockets 55 are alignable with the bores 29 in the first member. Each of the pair of sockets 55 contains a spherically shaped socket for receiving the ball portion in thrust bearing relationship. Each socket 55 comprises a base portion 57 and a cap portion 59. The base portion 57 is permanently affixed to the second member 53 and has a hemispherically shaped bearing surface 61 therewithin. It is ordinarily advantageous to provide a replaceable bearing liner 63 to define the hemispherically shaped surface 61. In this way, the bearing liner 63 may be replaced if it becomes worn. If desired, bearing liner 63 may be a lubrication-containing liner such as the fluorocarbon impregnated liners. On the other hand, conventional grease fittings and grease channels may be provided for periodic and external lubrication.

Cap portion 59 also has a hemispherically shaped bearing surface 65 therewithin, advantageously in the form of a replaceable bearing liner also. The cap portion 59 is adapted to conformingly engage the base portion 57.

Ordinarily, it is advantageous to employ a bearing retainer 67 intermediate the cap portion 59 and the base portion 57. The bearing retainer 67 is adapted for a conforming fit therebetween and has a circularly shaped slot 68 for fitting over the ball portion 35.

A plurality of socket shims 69 conformingly fit intermediate the base portion 57 and the cap portion 59 for adjusting the bearing clearance between socket 55 and the ball portion 35. Each of the socket shims 69 have a circularly shaped slot like slot 68 for fitting over the ball portion 35.

A second fastening means is provided for adjustably connecting the respective cap portions of the socket means with the respective base portions. Each second fastening means comprises a plurality of bolt apertures 71 through the cap portion 59; a plurality of threaded apertures 73 in the base portion 57; and a plurality of threaded stud bolts 75. The bolt apertures 71 are adapted to permit penetration of the stud bolts 75 therethrough. The threaded apertures 73 are adapted to conformingly receive the threaded portion of threaded stud bolts 75 so that the cap portion 59 may be drawn toward the base portion regardless of the number of the socket shims 61 and the bearing retainers 67 therebetween. As is apparent from FIG. 2, the socket shims 69 and the bearing retainer 67 each contain the plurality of bolt apertures 71 for allowing passage of the stud bolts 75 therethrough. The socket 55 is easily adjusted for wear between its internal spherical surface and the ball portion 35 by removal of stud bolts 75; removal of one or more shims from between the base portion 57 and the cap portion 59; and reassembly of the cap portion 59 onto base portion 57 by reinsertion of stud bolts 75. Moreover, the socket 55 can be accommodated to the insertion of a new ball portion 35, as by replacement of a worn ball pin 33 with an unworn ball pin 33, by restoration of an appropriate number of shims between the cap portion 59 and base portion 57, and reassembly as described.

The assembled pivot connection 21 is better illustrated in FIG. 3. Therein, the ball portion 35 is shown conformingly engaging its respective socket 55 with correct axial adjustment and centering; effected by the insertion of the requisite number of pin shims 41 before the collet base portion 39 is affixed to arm 27 by stud bolts 46. An appropriate number of socket shims 69 are inserted between cap portion 59 and base portion 57 to obtain the desired bearing clearance. If desired, the pin shims may be employed with only the upper ball pin to effect the desired axial alignment. In any event, however, the bottom ball pin is removable so that it may be replaced when it becomes worn.

In operation, the first member 23 and the second member 53 of the articulated vehicle are juxtaposed with bores 29 and base portions 57 aligned. The ball pins 33 are inserted with the proper number of pin shims 41 to effect the desired axial alignment of the ball portions 35 and the sockets. If desired, no shims may be employed with one of either of the bottom ball pin or the top pin and all of the shims employed with the other ball pin.

It has been found advantageous in initial installation to assemble the respective shims, effect the desired axial alignment, and then split the shims through respective and diametrically opposed bolt apertures, illustrated by split cut 42, FIG. 2. In this way, split shims facilitating field removal are effected; yet errors through miscounting of halves or mismatching of thicknesses of halves of the shims are avoided.

The bearing liners 63 are inserted in the respective sockets, the requisite number of socket shims 69, the respective bearing retainer 67, and the cap portions 59 are assembled onto the respective base portions 57 of the respective sockets 55 enclosing the respective ball portions 35 of the ball pins 33. The pivot connection of the articulated vehicle is then completed.

When the ball pins and bearing liners become worn, the respective stud bolts are removed and the requisite number of shims taken out. If split pin shims are employed; the two, or more, stud bolts 46 through the bolt apertures 51 at which the split cut 42 was initially made, are retained in place to maintain unity of the assembly, and only the remainder of the stud bolts 46 are removed. The sections of the pin shims are taken out and the ball portion and its receiving socket realigned to compensate for wear.

When the wear becomes severe enough, the studs are removed and a new ball pin is inserted. Ordinarily, a new corresponding socket liner 63 is inserted also. The requisite number of respective pin shims and socket shims are reinserted, as described hereinbefore, and the pivot connection reassembled.

Thus, it can be seen that this invention enables an easy, rapid, and economical maintainence of safe, excellently operating pivot connection. With unworn ball pins and unworn socket liners, and proper alignment by way of suitable shims, a pivot connection that is essentially new is readily and economically effected. The meticulous and time-consuming manufacture of the permanently affixed ball pins and permanently affixed socket base portions, in accordance with the prior art, is avoided, since axial adjustment is so easily effected by the inclusion of the pin shims. Moreover, greater tolerance is allowed in the manufacture of the cap portion and the base portion of the socket, since the necessary number of socket shims can be employed to effect the desired bearing clearance. Thus, initial assembly is facilitated and the expensive, careful manufacturing operation obviated.

One of the advantages of this invention is that the materials of construction ordinarily employed in fabricating bearing surfaces may be employed in this invention. Moreover, the design of the respective first and second members and the respective ball portions and sockets are known and need not be described in detail herein.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. A pivot connection comprising:
   a. a first member having a bifurcated yoke structure with a pair of cylindrical bores having a common lineal axis and disposed in respective arms of said yoke structure;
   b. a pair of ball pins for being inserted through respective said cylindrical bores, each said ball pin comprising:
      i. a spherically shaped ball portion disposed at one end for pivotally engaging a spherically shaped bearing socket in thrust bearing relationship;
      ii. a cylindrical shank portion connected with said ball portion and adapted to conformingly engage said cylindrical bore in thrust bearing relationship; and
      iii. a collet base portion connected to the other end of said shank portion;
   c. a plurality of pin shims, each shim being adapted to fit over said cylindrical shank and between said collet base portion and said first member for spacing said ball portion with respect to said first member;
   d. first fastening means for connecting respective said ball pins to respective said arms of said first member with said shank in thrust bearing relationship with said bore;
   e. a second member adapted to hingingly engage said first member;
   f. a pair of spherically shaped bearing sockets connected with said second member and adapted to receive said ball portion in thrust bearing relationship, each said bearing socket comprising:
      i. a base portion permanently affixed to said second member and having a hemispherically shaped bearing surface therewithin; and
      ii. a cap portion having a hemispherically shaped bearing surface therein and adapted to conformingly engage said base portion;
   g. a plurality of socket shims, each shim being adapted for a conforming fit intermediate a respective said cap portion and said base portion and having a circularly shaped slot for fitting over said ball portion; and
   h. second fastening means for adjustably connecting respective said cap portions to said base portions; whereby, each said ball portion may be adjustably aligned and centered with respect to each respective said bearing socket and bearing clearance therein adjusted by use of said shims to facilitate initial alignment and installation; and whereby shims may be removed, as said ball portion becomes worn, to maintain alignment, centering, and bearing clearance.

2. The pivot connection of claim 1 wherein said ball pins are replaceable with unworn ball pins.

3. The pivot connection of claim 1 wherein each said bearing socket has a bearing liner that is replaceable with an unworn bearing liner.

4. The pivot connection of claim 1 wherein each said bearing socket has a bearing retainer adapted for a conforming fit intermediate said cap portion and said base portion and having a circularly shaped slot for fitting over said ball portion.

5. The pivot connection of claim 1 wherein a respective said second fastener means comprises a plurality of bolt apertures through said cap portion; a plurality of threaded apertures in said base portion; said threaded apertures matching said bolt apertures; and a plurality of threaded stud bolts for penetrating through said bolt apertures and threadedly engaging said threaded apertures; whereby said cap portion may be drawn toward said base portion regardless of the number of socket shims and bearing retainers therebetween.

6. The pivot connection of claim 1 wherein at least one of said pin shims is split through diametrically opposed bolt apertures to form a plurality of sections for facilitating field removal.

* * * * *